Oct. 4, 1932.   A. L. RAWLINGS   1,880,982
MOUNTING FOR COMPASSES
Filed May 12, 1930   2 Sheets-Sheet 1

INVENTOR
ARTHUR L. RAWLINGS.
BY Herbert H. Thompson
his ATTORNEY.

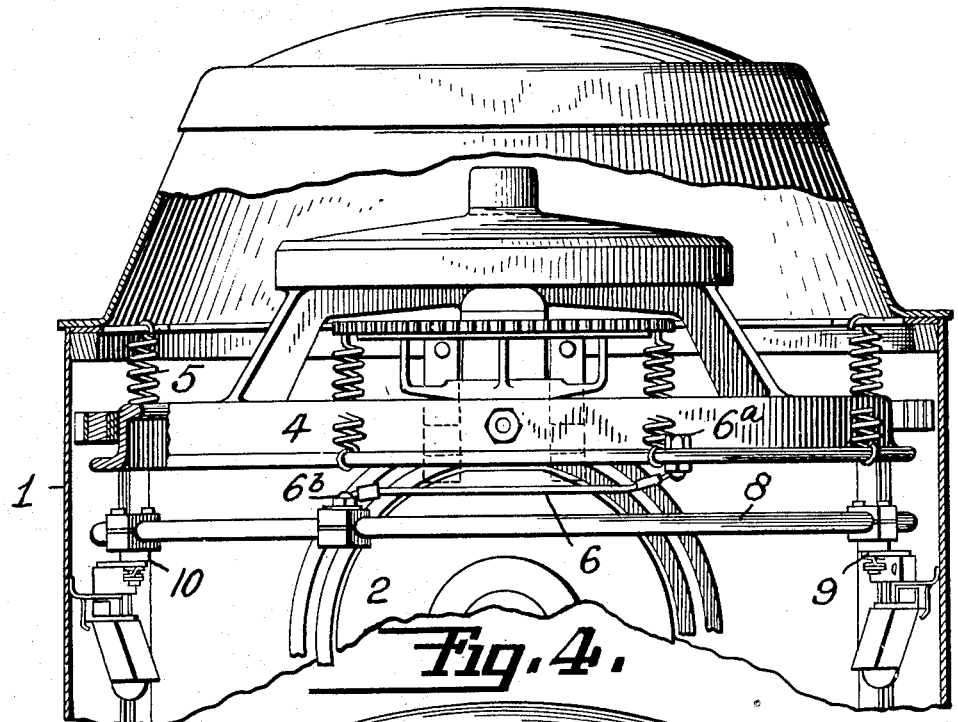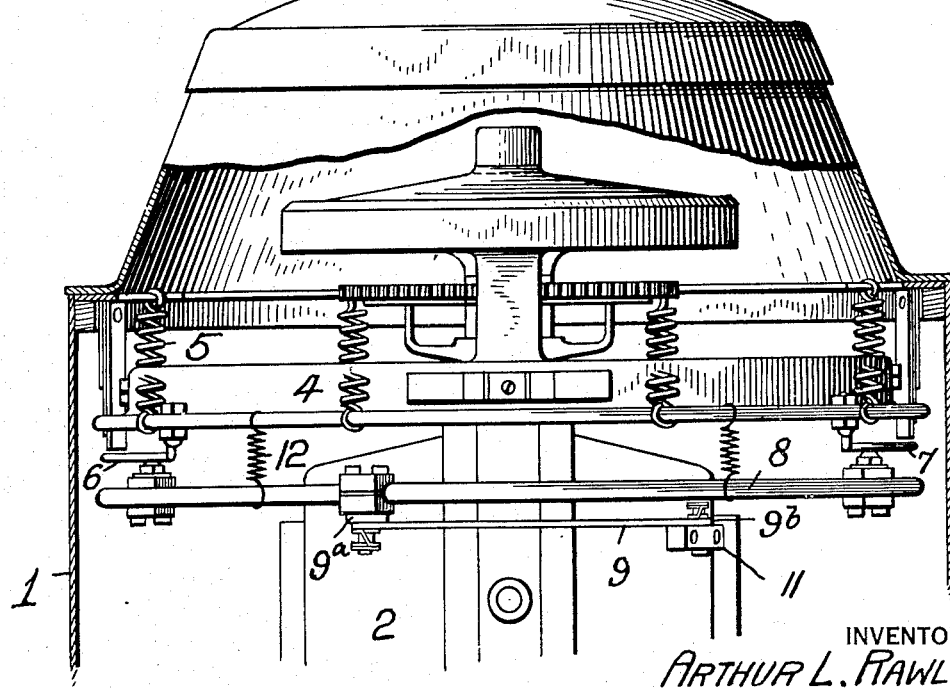

UNITED STATES PATENT OFFICE

ARTHUR L. RAWLINGS, OF LONDON, ENGLAND, ASSIGNOR TO SPERRY GYROSCOPE COMPANY, INC., OF BROOKLYN, NEW YORK, A CORPORATION OF NEW YORK

MOUNTING FOR COMPASSES

Application filed May 12, 1930, Serial No. 451,539, and in Great Britain May 24, 1929.

This invention relates to compasses, whether magnetic or gyroscopic, in which some form of resilient support is used between the binnacle and the compass proper to minimize the effect of shocks and vibrations. Almost all compasses at present in use embody some such resilient support, which may take the form of pads of horse hair or sponge rubber or of suspension springs on which the compass itself is slung in its binnacle. All these arrangements allow of a certain amount of angular displacement of the lubbers line of the compass relatively to the fore and aft line of the ship, and this introduces the possibility of error in the determination of the ship's head as read from the compass.

According to the persent invention, the above mentioned error is prevented by employing between the compass proper and the binnacle in which it is resiliently supported a mechanical movement system, independent of the resilient support, connecting the compass proper to the binnacle in such a manner as to permit freedom of translation in any direction but prevent the above mentioned angular displacement. The object of the invention is to prevent the turning of the binnacle ring 4 within the binnacle when it bounces up and down or sways sideways on its spring suspension 5. Translatory movements of the compass within the binnacle are not transmitted to the repeater compasses and hence are immaterial, but any twisting of the binnacle ring is immediately transmitted as an error to the repeater compasses and it is the object of this invention to avoid this error.

For the purpose in view, a system of parallel motions is convenient.

In order that the invention may be clearly understood and readily carried into effect, the same will now be described more fully with reference to the accompanying drawings in which:

Fig. 3 is a front sectional elevation.

Fig. 4 is an elevational view at right angles to Fig. 3.

Figure 1:
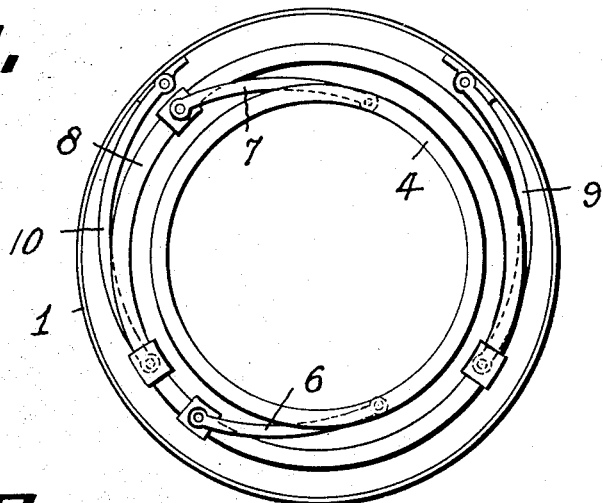
Fig. 1 is a schematic diagram.
Figure 2:
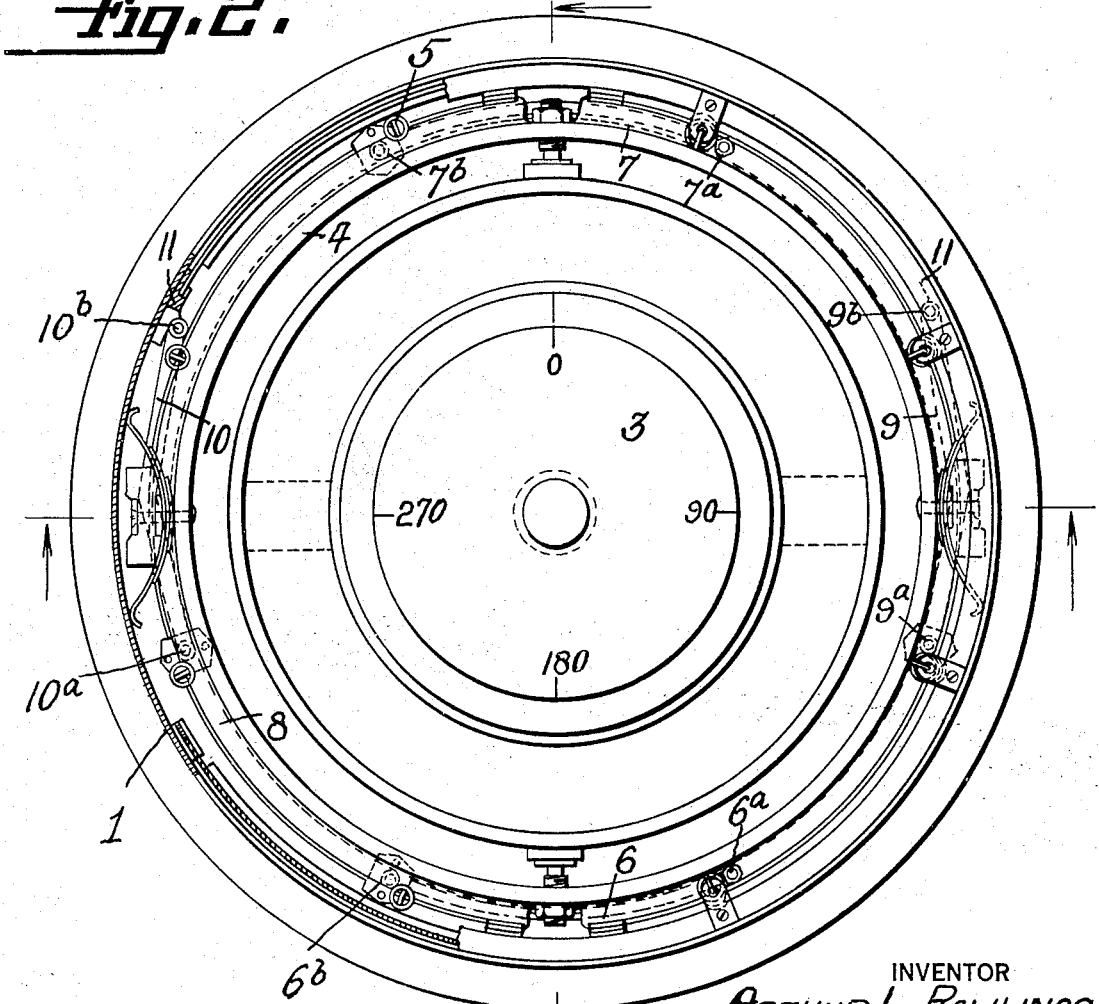
Fig. 2 is a plan view of a gyro compass suspended from its binnacle by one embodiment of means according to the present invention.

The construction of the compass itself forms no part of the present invention. In the accompanying drawings, a few of the parts of the Sperry gyro compass are shown for convenience of illustration and description.

1 represents the usual binnacle; 2 the gyro casing; 3 the compass card; and 4 the usual horizontal supporting ring suspended from the binnacle by a group of springs 5. Up to this point the construction differs in no way from what has been common practice heretofore. According to the present invention there is interposed between the ring 4 and the binnacle a mechanical movement system consisting, in the embodiment shown, of a pair of parallel links 6 and 7, a horizontal ring 8, and a second pair of parallel links 9 and 10 set transverse with respect to the first mentioned pair, i. e. at right angles as seen in plan.

The links 6 and 7 are connected at the ends 6a and 7a to the ends of a chord of the ring 4 and are connected at their other ends 6b and 7b to the ring 8, the links being parallel and normally extending at right angles to the chord joining their ends 6a, 7a. The end connections 6a, 6b, 7a, 7b, are preferably in the form of universal joints as shown.

The ring 8 is preferably formed of tubular metal and of about the same diameter as that of the spring suspended ring 4.

The links 9 and 10 are connected at their ends 9a and 10a to the ring 8 and at their other ends 9b and 10b to brackets 11 supported by the binnacle 1. The end connections 9a, 9b, 10a, 10b, are in the form of pivots with vertical axes. The links 9 and 10 are preferably strip-shaped having their greater cross sectional axis set horizontally so that a limited up-and-down freedom of the linkage is afforded by flexure of these links. Alternatively the end connections might be of the ball and socket type in which case the links need not be flexible.

The shape of the links 6, 7 and 9, 10 may be suited to allow all necessary clearance when the ship rolls or pitches.

The weight of the ring 8 may be taken solely by the links 9 and 10 or, alternatively, its actual weight may be taken by light springs such as 12 connected between the rings 4 and 8, the strength of these springs being, however, insufficient to restrict the freedom of movement of the ring 8.

The weight of the compass proper is supported in the usual way by the suspension springs 5. The links 6, 7, 9, 10 and the ring 8 which embody the present invention do not limit the vertical motion of the compass in any way.

From the foregoing description it will be apparent that the constraint on the ring 4, due to the linkage system, is such that the compass has freedom of translation in any direction but no freedom of angular displacement about a line perpendicular to the deck of a ship on which it is assumed to be mounted.

Having described my invention, what I claim and desire to secure by Letters Patent is:

1. A support for gyroscopic compasses having a binnacle ring, including a binnacle, a resilient connection for supporting said binnacle ring from said binnacle, and means for connecting said ring to said binnacle which, while permitting freedom of translatory movement in any direction, prevents angular displacement of said ring with respect to said binnacle.

2. A support for gyroscopic compasses having a binnacle ring, including a binnacle, a resilient connection for supporting said binnacle ring from said binnacle, and a parallel motion linkage system for connecting said ring to said binnacle which, while permitting freedom of translatory motion of said ring, prevents angular displacement of said ring in azimuth.

3. A support for gyroscopic compasses having a binnacle ring, including a binnacle, a resilient connection for supporting said binnacle ring from said binnacle, an auxiliary ring suspended from said binnacle ring, a pair of links connecting said binnacle and said auxiliary ring, and a second pair of links connecting said auxiliary ring and said binnacle ring for the purpose specified.

4. A support for gyroscopic compasses having a binnacle ring, including a binnacle, a resilient connection for supporting said binnacle ring from said binnacle, an auxiliary ring suspended from said binnacle ring, a pair of oppositely positioned links connecting said binnacle and said auxiliary ring, and a second pair of oppositely positioned links positioned at right angles to said first pair and connecting said auxiliary ring and said binnacle ring, said links being strip-shaped with their least thickness lying in horizontal planes.

5. A support for gyroscopic compasses having a binnacle ring, including a binnacle, a resilient connection for supporting said binnacle ring from said binnacle, an auxiliary ring, spring means for suspending the same from said binnacle ring, a pair of links connecting said binnacle and said auxiliary ring, and a second pair of links connecting said auxiliary ring and said binnacle ring for the purpose specified.

In testimony whereof I have affixed my signature.

ARTHUR L. RAWLINGS.